United States Patent [19]

Cunningham et al.

[11] Patent Number: 4,816,503

[45] Date of Patent: Mar. 28, 1989

[54] POLYMER CONCRETE HAVING HIGH BOND STRENGTH AND LONG WORKING TIME

[75] Inventors: William C. Cunningham, Angleton; Randy A. Ramsey; Randal E. Autenrieth, both of Lake Jackson, all of Tex.

[73] Assignee: The Dow Chemical Company, Midland, Mich.

[21] Appl. No.: 35,959

[22] Filed: Apr. 8, 1987

Related U.S. Application Data

[63] Continuation-in-part of Ser. No. 870,587, Jun. 4, 1986, abandoned.

[51] Int. Cl.$^4$ .......................... C08K 3/34; C08L 67/06; C08L 77/12; C08L 25/08
[52] U.S. Cl. ...................... 523/521; 523/523; 523/526; 524/513; 524/514; 524/518; 524/521; 524/522; 524/531
[58] Field of Search ............... 523/512, 521, 526, 523; 524/518, 522, 531, 513, 514

[56] References Cited

U.S. PATENT DOCUMENTS

| | | | |
|---|---|---|---|
| 4,371,639 | 2/1983 | Muszynski | 523/512 |
| 4,409,344 | 10/1983 | Moolson et al. | 523/521 |
| 4,522,958 | 6/1985 | Das et al. | 523/512 |
| 4,611,015 | 9/1986 | Hefner, Jr. et al. | 523/526 |
| 4,737,538 | 4/1988 | Halper et al. | 524/538 |

*Primary Examiner*—Allan M. Lieberman
*Attorney, Agent, or Firm*—B. G. Colley

[57] ABSTRACT

Polymer concretes having a high bond strength and/or long working times are made from a curable composition of norbornyl modified unsaturated polyester or polyesteramide resins blended with a polymerizable monomer such as styrene, an aggregate mixture such as sand and gravel and an effective amount of styrene acrylonitrile copolymers, styrene alphamethylstyrene copolymers, or a styrene acrylonitrile copolymer mixture with no more than 25% by weight polystyrene.

9 Claims, No Drawings

POLYMER CONCRETE HAVING HIGH BOND STRENGTH AND LONG WORKING TIME

CROSS REFERENCE TO RELATED APPLICATIONS

This application is a continuation-in-part of Serial Number 870,587 filed June 4, 1986, now abandoned.

BACKGROUND OF THE INVENTION

This invention relates to polymer concretes wherein a styrene copolymer is added to give high bond strengths and long working times.

It is known from U.S. patents 4,228,251, 4,233,413 and 4,309,519 and other related patents that polystyrene can be used to impart low shrink properties to polyester sheet molding and bulk molding compositions.

As is shown in patents 4,212,790 and 4,371,639 polymer concretes are completely different from sheet molding compounds in that several grades of coarse and fine aggregates are used in polymer concretes at a high level such as 90% by weight.

SUMMARY OF THE INVENTION

The present invention is based on the discovery that certain styrene copolymers can be added to a polymer concrete composition in order to obtain high bond strength and long working times for the resulting cured polymer concrete.

The curable polymer concrete composition of this invention has the following components
  (a) a norbornyl modified unsaturated polyester or polyesteramide resin blend with a polymerizable monomer
  (b) an aggregate mixture, and
  (c) an effective amount of a styrene copolymer additive selected from the group consisting of
    (1) styrene acrylonitrile copolymers,
    (2) styrene alphamethylstyrene copolymers, and
    (3) styrene acrylonitrile copolymer mixtures with no more than 25% by weight of polystyrene.

DETAILED DESCRIPTION OF THE INVENTION

Polymer concrete is a composition made by blending of a curable resin component and an aggregate component. The polymer concrete composition of this invention is prepared by blending from about 6 percent to about 25 percent by weight of a polymer blend or composition with from about 93 to about 64 percent by weight of an aggregate component. Preferably, these ranges are 8 to 15 and 79 to 90 respectively. The aggregate component is typically sand, gravel, crushed stone or rock, silica flour, fly ash, and the like or mixtures thereof. Up to about 50 percent by weight of metal fines, glass fibers, synthetic fibers, glass reinforcing mats, metal turnings, metal fibers, hydrated alumina, ceramic beads and the like or mixtures thereof may be present in the aggregate composition. The exact components used in the aggregate composition are generally dictated by the physical properties required of the cured polymer concrete composition. Thus, optimal aggregate particle size distribution and physical configuration can be determined by simple preliminary experiments. U.S. Pat. No. 4,371,639 discloses the usual components for making polymer concrete; this reference is incorporated herein by reference.

The polymer blend is a composition of 20 to 99% by weight of norbornyl modified unsaturated polyester or polyesteramide resin with 1 to 80% by weight of a polymerizable monomer such as styrene.

The remainder of the polymer concrete is an amount of styrene copolymer additive which is effective to give a measurable increase in bond strength and/or a longer working time. Generally, this amount is 1.0 to 11% by weight and preferably 2 to 6% by weight.

Examples of useful additives are styrene acrylonitrile copolymer (SAN) containing 20 to 40% acrylonitrile and 60 to 80% styrene with a weight average molecular weight range from 5,000 to 1,000,000. The preferred molecular weight is about 145,000.

Another useful additive is a copolymer of alphamethylstyrene with styrene containing 20 to 80% alphamethylstyrene and 80 to 20% styrene with a molecular weight of about 160,000. The range of the molecular weight is 5,000 to 1,000,000.

An additional additive is a blend of styrene acrylonitrile (SAN) copolymers with no more than 25% by weight of polystyrene. The range of polystyrene in the blend can thus be from about 1 to about 25% by weight. Both the SAN and polystyrene can have a molecular weight in the range from 5000 to 1,000,000.

The polymer used in this invention are blended with ethylenically unsaturated or polymerizable monomers that are compatible therewith. Typical of the monomers are vinyl monomers such as alkenyl aromatics, such as styrene, divinylbenzene or vinyltoluene. Acrylic monomers, although less preferred, may also be used separately or in conjunction with the monomer.

Typical of the acrylic monomers are methylmethacrylate or dicyclopentadiene acrylate. Other useful vinyl monomers will be known to the skilled worker. The vinyl monomer, frequently called a reactive diluent, may be employed within a wide range of concentration of from about 20 to 60 percent of diluent to 80 to 40 percent of the resin. The optimum amount will depend in large measure on the polymer used, the diluent and the properties desired in the uncured and the cured states. Reactive diluents are employed principally to adjust the viscosity of a resin blend to permit its facile use in a given fabrication procedure.

The unsaturated polymer aggregate blends or mixtures are curable by known catalyst systems. Peroxides, such as methyl ethyl ketone peroxides, can be used with or without known promoters, such as cobalt octoate or cobalt naphthenate, that function with such peroxides. Acyl peroxides, such as benzoyl peroxides can be used with or without promoters such as tertiary amines, including typically dimethyl aniline and N,N dimethyl-p-toluidine. The concentrations of catalyst and promoter are adjusted within known limits of from about 0.1 to 6.0 weight percent depending on the rate of cure desired, the magnitude of the generated exotherm and for other known purposes. Known gelation retarding agents, such as p-benzoquinone, can be employed in the curing system.

The norbornyl modified unsaturated polyesteramides used in the instant invention are known from U.S. Pat. No. 4,410,686 which is incorporated by reference herein.

The polyols used in either norbornyl terminated unsaturated polyesters or polyesteramides are from the class of those having the formula: HO-R-OH where R is a divalent organic radical selected from the group consisting of alkylene, ether-linked alkylene, ether-linked arylene, cycloalkylene, polycycloalkylene, bis(alkyl)cycloalkylene, bis(alkyl)polycycloalkylene, and arylene. Mixtures of two or more of such polyols can also be used.

The polyamines used to make norbornyl terminated unsaturated polyesteramides are from the class of those having the formula:

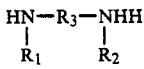

where $R_1$ and $R_2$ are independently selected from the group consisting of hydrogen, aliphatic, cycloaliphatic and aromatic radicals, or $R_1$ and $R_2$ taken together with the remainder of the molecule form an aliphatic ring; and $R_3$ is a divalent organic radical selected from the group consisting of alkylene ether-linked alkylene, ether-linked arylene, alkylene amino-linked alkylene, alkylene amino-linked cycloalkylene, cycloalkylene, polycycloalkylene, arylene, alkylarylene, bis(alkyl)cycloalkylene and bis(alkyl)polycycloalkylene. Mixtures of two or more of such polyamines can also be used.

Typical polyamines that are useful are ethylenediamine, propylenediamine, hexane-1,6-diamine, piperazine, 4,4'-methylenebis(cyclohexylamine), 2,2'bis(4-aminocyclohexyl)propane, 4,4'-diaminodiphenyl ether, bis(aminomethyl)norbornane, toluene diamine, bis-(aminomethyl)dicyclopentadiene and homopiperazine. Typical polyamines are aminoethylpiperazine and diethylenetriamine.

Representatives of the useful diols are: ethylene glycol, propylene glycol, diethylene glycol, dipropylene glycol, dicyclopentadiene dimethanol, bis(hydroxymethyl)norbornane, methyl cyclohexanedimethanol, bis(-hydroxypropyl)bisphenol A and other hydroxyalkylated bisphenols. Typical polyols are pentaerythritol and glycerine propoxylates.

The $\alpha,\beta$-unsaturated polycarboxylic acid is preferably maleic acid, fumaric acid, the anhydride of maleic acid or mixtures of these compounds. Such acids are readily available, have good reactivity with the diol and/or the diamine, and result in products of good properties. Other less preferred polycarboxylic acids include itaconic acid, citraconic acid, and the like.

Part of the $\alpha,\beta$-unsaturated polycarboxylic acid may be replaced with a saturated or aromatic polycarboxylic acid to vary the crosslinking potential and physical properties of the norbornyl terminated polyester or polyesteramide. Such acids include the aliphatic acids such as adipic acid and the aromatic acids such as isophthalic acid. Replacement of part of the $\alpha,\beta$-unsaturated acid with such acids is commonplace in the polyester art. Suitable selection of the acid and the amount necessary to achieve a desired purpose will be known to the skilled worker and can be optimized with simple preliminary experiments.

The total amount of acid varies as a function of the total polyol and/or polyamine and norbornyl ingredients used.

The group used to terminate the unsaturated polyester or polyesteramide is a norbornyl radical. Dicyclopentadiene (DCPD) is a most preferred norbornyl functional material to be employed in terminating one or both ends of the chains. Polycyclopentadiene (i.e., DCPD oligomers) or dicyclopentadiene monoalcohol are also preferred species.

DCPD is sold commercially as a product of about 97 or greater percent purity. It is also sold as a $C_{10}$ hydrocarbon concentrate prepared by dimerizing a crude $C_5$ stream from the cracking of hydrocarbons as taught in U.S. Pat. No. 3,557,239.

Examples of some of the dimers which have been identified in these concentrates are the Diels-Alder adducts of two moles of isoprene (isoprene dimers), the adduct of cyclopentadiene and isoprene, the adduct of cyclopentadiene and piperylene and the like.

Either the $C_{10}$ concentrate or the relatively pure DCPD may be employed in preparing the norbornyl terminated polyesters or polyesteramides.

The norbornyl terminated unsaturated polyesters or polyesteramides can be prepared by a variety of techniques. In a preferred method, molten $\alpha,\beta$-unsaturated carboxylic acid anhydride is partially hydrolyzed with less than the stoichiometric equivalent of water and reacted with the norbornyl derivative to form an ester of that derivative and containing unesterified acid and anhydride. This reaction may conveniently be performed in staged whereby a reactant is added stepwise to control reaction exotherms. The product mixture is then reacted with the diol and/or diamine to result in the desired norbornyl terminated unsaturated polyester or polyesteramide.

In a typical procedure, molten maleic anhydride and a fraction of the stoichiometric equivalent of water is maintained at an elevated temperature of from about 60° to 130° C. The initial fractional equivalent of dicyclopentadiene (DCPD) is then added and allowed to react. A second fractional equivalent of water and of DCPD is added and allowed to react. Additional fractional equivalents of DCPD are added and each allowed to react before addition of the next increment until the desired amount of DCPD has been added. The number of fractional equivalents can be increased and the size of each fractional equivalent correspondingly decreased to any desired number of fractional equivalents, including continuous addition. The relative size of the fractional equivalents can vary.

The amount of maleic (or other anhydride employed in this first esterification step may be equal to the equivalent of DCPD in which event the product is essentially all ester. Alternatively, the amount of anhydride may be the equivalent needed to make the ester plus that excess that is to be used in the subsequent esterification or esteramidation step.

To the mixture of esterified DCPD and acid and/or anhydride is added the polyol and polyamine or the polyol alone. After addition of the polyol and polyamine or the polyol alone is complete, the reaction can be driven to maximum yield by maintaining or increasing the temperature until the desired acid number has been reached. Typically, acid numbers of 15 to 35 are preferred, with acid numbers of 15 to 25 being most preferred; although acid numbers that are higher or lower may be tolerated, and, in some instances, may be desired.

In an equally preferred method, molten $\alpha,\beta$-unsaturated carboxylic acid anhydride is essentially totally hydrolyzed with a stoichiometric or greater equivalent or water and reacted with the norbornyl derivative to form an ester of that derivative and containing unesterified acid. This reaction may conveniently be performed in stages whereby a reactant is added stepwise, controlling reaction exotherms. The product mixture is then reacted with the polyol and polyamine or the polyol alone to result in the desired norbornyl terminated unsaturated polyester or polyesteramide.

In a typical procedure, molten maleic anhydride and the stoichiometric or greater equivalent of water are maintained at an elevated temperature from about 50° to 150° C. The temperature is allowed to stabilize at about 120° to 125° C. and the initial fractional equivalent of DCPD is then added and allowed to react. A second fractional equivalent of water and of DCPD is added and allowed to react. Additional fractional equivalents of DCPD are added and each allowed to react before addition of the next increment until the desired amount of DCPD has been added. The number of fractional equivalent correspondingly decreased to any desired number of fractional equivalents, including continuous addition. The relative size of the fractional equivalents can vary.

The amount of maleic (or other) anhydride employed in this first esterification step may be equal to the equivalent of DCPD in which event the product is essentially all ester. Alternatively, the amount of anhydride may be the equivalent needed to make the ester plus that excess that is to be used in the subsequent esterification or esteramidation step.

The polyol and polyamine or the polyol alone are added to the mixture of esterified DCPD and acid as previously described.

Many other alternate methods will be recognized by the skilled worker. For example, molten maleic anhydride may be added to a mixtures of DCPD and water in a reactor. The polyol and polyamine or the polyol alone are added to the mixture of esterified DCPD and acid and/or anhydride as before. Finally, although less preferred, DCPD, maleic anhydride, water and glycol may be simultaneously reacted in a fashion similar to U.S. Pat. No. 4,148,765.

The following examples are given to illustrate the invention and not to limit the scope of the invention. All parts and percentages are by weight unless otherwise specified.

Control A

Four linear shrinkage test pieces were made according to ASTM C-531 in one by one by ten inch molds. A dicyclopentadiene modified polyesteramide resin made in accordance with U.S. Pat. No. 4,410,686 was used to make the above test pieces from a 1750 gram batch of polymer concrete. A 192.5 gram sample of the resin (11% of the batch) was catalyzed with 5.78 grams of methyl ethyl ketone peroxide and 0.96 grams of 6% cobalt naphthenate solution. The resin sample contained 50% styrene (by weight) as a reactive diluent. At this catalyst level, the resin will gel in about 18 minutes at 23 deg. C. It contained no shrink control additives and had a work time of 18 minutes.

To the catalyzed resin, the following components were added with stirring:

155.75 grams (8.9%) of 200-400 mesh silica flour;

311.50 grams (17.8%) of number 5 blasting and; and 1090.25 grams (62.3%) of ⅛-¼ inch gravel.

The mixture was placed in the molds and cured for 16 hours at 23° C.

The samples were then post-cured in an oven at 65° C. for 16 hours and then cooled to room temperature (23° C.). The samples were then measured and the percent linear shrinkage was calculated based on the original length and the length after cure at 65° C. The results are set forth in Table I as the average of four test pieces.

EXAMPLES 1 TO 6

In a manner similar to Control A other test pieces were molded and tested except that various amounts and types of styrene polymer and/or copolymers were added with the aggregate. The results of the four test pieces in each example were averaged and reported in Table I.

Control B

This mix which had a gel time of 18 minutes could be troweled and worked only four minutes before adhering to the tools. A homogeneous mixture was maintained.

EXAMPLES 1, 2, AND 3

These mixes had gel times of 18 minutes and could be screeded and trowelled for 18 minutes but did not maintain a homogeneous blend. (The fine sand and silica flour appeared to settle to the bottom on these examples).

EXAMPLE 4

This blend also had a gel time of 18 minutes and could be screeded on trowelled the full 18 minutes while maintaining a homogenous mixture.

EXAMPLE 5

This example had a gel time of 18 minutes but could be screeded and trowelled only 8 minutes. After eight minutes the polymer concrete became quite sticky and adhered to the finishing tools as well as the application surface. A homogeneous mixture was maintained however.

Control C

This mix with an 18 minute gel time could be trowelled and worked only four minutes before adhering to the tools. A homogeneous mixture was maintained.

EXAMPLE 6

This blend with an 18 minute gel time was workable for the full 18 minutes but did not maintain a homogeneous mixture.

TABLE I

| Polyesteramide Resin Concrete | | | | |
| --- | --- | --- | --- | --- |
| Run | % Resin | % SF | % Sand | % Gravel |
| Cont. A | 11 | 8.9 | 17.8 | 62.3 |
| Cont. B | 11 | 8.6 | 17.2 | 60.1 |
| Ex. 1 | 11 | 8.6 | 17.2 | 60.1 |
| Ex. 2 | 11 | 8.6 | 17.2 | 60.1 |
| Ex. 3 | 11 | 8.4 | 16.8 | 59.1 |
| Ex. 4 | 11 | 8.6 | 17.2 | 60.1 |
| Ex. 5 | 11 | 8.6 | 17.2 | 60.1 |
| Cont. C | 11 | 8.6 | 17.2 | 60.1 |
| Ex. 6 | 11 | 8.6 | 17.2 | 60.1 |

| Run | % & Type SP/C | % Linear Shrinkage | Work Time (min.) |
| --- | --- | --- | --- |
| Cont. A | 0 | 0.26 | 18 |
| Cont. B | 3.1 (P.S.) | 0.02 | 4 |
| Ex. 1 | 3.1 (SAN 100) | 0.08 | 18 |
| Ex. 2 | 3.1 (30 Mesh SAN 100) | 0.05 | 18 |
| Ex. 3 | 4.7 (SAN 100) | 0.05 | 18 |
| Ex. 4 | 3.1 (SAN 100 = 92.5%) (P.S. = 7.5%) | 0.07 | 18 |
| Ex. 5 | 3.1 | 0.05 | 8 |

TABLE I-continued

| | Polyesteramide Resin Concrete | | |
|---|---|---|---|
| Cont. C | (SAN 100 = 75%)<br>(P.S. = 25%)<br>3.1 | 0.04 | 4 |
| Ex. 6 | (SAN 100 = 50%)<br>(P.S. = 50%)<br>3.1<br>(SAMS 30) | 0.05 | 18 |

NOTE:
SF — silica flour
Sand — Number 5 blasting sand
Gravel — ⅛-¼ inch gravel
SP/C — styrene polymer and/or copolymer
SAN 100 — styrene acrylonitrile copolymer
SAMS 30 — styrene alphamethylstyrene copolymer
P.S. — polystyrene
Note:
all examples and controls used additives that were 16 mesh or finer

Control D

The procedure of Control A was repeated using a dicyclopentadiene modified polyesteramide resin made in accordance with U.S. patent 4,410,686. The resin sample contained 60% styrene (by weight) as a reactive diluent. A 1750 gram batch of polymer concrete was made using 192.5 grams (11%) of the above resin. This was catalyzed with 5.78 grams of methyl ethyl ketone peroxide and 0.96 grams of 6% cobalt naphthenate solution. At this catalyst level the resin will gel in about 18 minutes at 23 deg C..

Following the procedure of Control A, 8.9% of silica flour, 17.8% of number 5 blasting sand, and 62.3% of ⅛-¼ inch gravel was added to the catalyzed resin and the mixture was molded and cured into test bars. Four test bars were made and the linear shrinkage reported in Table II is the average.

EXAMPLES 7 TO 9

In a manner similar to Control D, other test pieces were molded and tested using various amounts of styrene polymer and copolymers with the aggregate. The results of the four test pieces in each example were averaged and reported in Table II.

TABLE II

| Run | % Resin | % SF | % Sand | % Gravel | % & Type SP/C | % Linear Shrinkage | Work Time (min.) |
|---|---|---|---|---|---|---|---|
| Cont. D | 11 | 8.9 | 17.8 | 62.3 | 0 | 0.19 | 18 |
| Ex. 7 | 11 | 8.6 | 17.2 | 60.1 | 3.1 (SAN 100 = 92.5%) (P.S. = 7.5%) | 0.02 | 18 |
| Ex. 8 | 11 | 8.4 | 16.8 | 59.1 | 4.7 (SAN 100 = 92.5%) (P.S. = 7.5%) | 0.01 | 10 |
| Ex. 9 | 11 | 8.4 | 16.8 | 59.1 | 4.7 (SAN 100 = 95%) (P.S. = 5%) | 0.02 | 10 |

NOTE:
SF — silica flour
Sand — Number 5 blasting sand
Gravel — ⅛-¼ inch gravel
SP/C — styrene polymer and/or copolymer
SAN 100 — styrene acrylonitrile copolymer
SAMS 30 — styrene alphamethylstyrene copolymer
P.S. — polystyrene
Note:
all examples and controls used additives that were 16 mesh or finer

Control E

The procedure of Control A was repeated using a dicyclopentadiene modified polyesteramide resin made in accordance with U.S. Pat. No. 4,410,686. The resin sample contained 70% styrene (by weight) as a reactive diluent. A 1750 gram batch of polymer concrete was made using 192.5 grams (11%) of the above resin. This was catalyzed with 5.78 grams of methyl ethyl ketone peroxide and 0.96 grams of 6% cobalt naphthenate solution. At this catalyst level the resin will gel in about 18 minutes at 23° C.

Following the procedure of Control A, 8.9% of silica flour, 17.8% of number 5 blasting sand, and 62.3% of ⅛-¼ inch gravel was added to the catalyzed resin and the mixture was molded and cured into test bars. Four test bars were made and the linear shrinkage reported in Table III is the average.

EXAMPLES 10 to 12

In a manner similar to Control E, other test pieces were molded and tested using various amounts of styrene polymer and copolymers with the aggregate. The results of the four test pieces in each example were averaged and reported in Table III.

TABLE III

| Run | % Resin | % SF | % Sand | % Gravel | % & Type SP/C | % Linear Shrinkage | Work Time (min.) |
|---|---|---|---|---|---|---|---|
| Cont. E | 11 | 8.9 | 17.8 | 62.3 | 0 | 0.15 | 18 |
| Ex. 10 | 11 | 8.6 | 17.2 | 60.1 | 3.1 (SAN 100 = 92.5%) (P.S. = 7.5%) | (—)0.001* | 18 |
| Ex. 11 | 11 | 8.4 | 16.8 | 59.1 | 4.7 (SAN 100 = 92.5%) (P.S. = 7.5%) | 0.008 | 10 |
| Ex. 12 | 11 | 8.4 | 16.8 | 59.1 | 4.7 (SAN 100 = 95%) | 0.002 | 10 |

TABLE III-continued

| Run | % Resin | % SF | % Sand | % Gravel | % & Type SP/C | % Linear Shrinkage | Work Time (min.) |
|---|---|---|---|---|---|---|---|
| | | | | | (P.S. = 5%) | | |

NOTE:
SF — silica flour
Sand — Number 5 blasting sand
Gravel — ⅛-¼ inch gravel
SP/C — styrene polymer and/or copolymer
SAN 100 — styrene acrylonitrile copolymer
SAMS 30 — styrene alphamethylstyrene copolymer
P.S. — polystyrene
*negative shrinkage is expansion
Note:
all examples and controls used additives that were 16 mesh or finer

Control F

The procedure of Control A was repeated using U.S.S. Chemicals commercially available norbornyl modified unsaturated polyester resin, MR 12803. The resin sample contained 36–39% styrene (by weight) as a reactive diluent which was increased to approximately 48% in order to improve viscosity. A 1850 gram batch of polymer concrete was made using 203.5 grams (11%) of the above resin. This was catalyzed with 3.05 grams methyl ethyl ketone peroxide, 1.02 grams of 6% cobalt naphthenate solution and 0.2 grams of dimethylaniline. At this catalyst level, the resin in the polymer concrete will gel in about 18 minutes at 23° C.

Following the procedure of Control A, 8.9% silica flour, 17.8% of number 5 blasting sand, and 62.3% of ⅛-¼ inch gravel was added to the catalyzed resin and the mixture was molded and cured into test bars. Four test bars were made and the linear shrinkage reported in Table IV is the average.

EXAMPLE 13

In a manner similar to Control F, other test pieces were molded and tested using styrene polymer and copolymers with the aggregate. The results of the four test pieces in each example were averaged and reported in Table IV.

Control G

The procedure of Control A was repeated using Aropol 8014, a commercially available norbornyl modified unsaturated polyester resin from The Ashland Chemical Co. The resin sample contained 25% styrene (by weight) as a reactive diluent which was increased to approximately 45% in order to improve viscosity. A 1750 gram batch of polymer concrete was made using 192.5 grams (11%) of the above resin. This was catalyzed with 4.3 grams methylethylketone peroxide, and 1.4 grams of 6% cobalt naphthenate solution. At this catalyst level, the resin in the polymer concrete will gel in about 16 minutes at 23° C.

Following the procedure of Control A, 8.9% silica flour, 17.8% of number 5 blasting sand, and 62.3% of ⅛-¼ inch gravel was added to the catalyzed resin and the mixture was molded and cured into test bars. Four test bars were made and the linear shrinkage reported in Table V is the average.

EXAMPLE 14

In a manner similar to Control G, other test pieces were molded and tested using styrene copolymers with the aggregate. The results of the four test pieces in each example were averaged and reported in Table V.

TABLE IV

Norbornyl Modified Polyester Resin Concrete

| Run | % Resin | % SF | % Sand | % Gravel | % & Type SP/C | % Linear Shrinkage | Work Time (min.) |
|---|---|---|---|---|---|---|---|
| Cont. F | 11 | 8.9 | 17.8 | 62.3 | 0 | 0.33 | 18 |
| Ex. 13 | 11 | 8.6 | 17.2 | 60.1 | 3.1 (SAN 100 = 92.5%) (P.S. = 7.5%) | 0.08 | 18 |

NOTE:
SF — silica flour
Sand — Number 5 blasting sand
Gravel — ⅛-¼ inch gravel
SP/C — styrene polymer and/or copolymer
SAN 100 — styrene acrylonitrile copolymer
P.S. — polystyrene

TABLE V

Norbornyl Modified Polyester Resin Concrete

| Run | % Resin | % SF | % Sand | % Gravel | % & Type SP/C | % Linear Shrinkage | Work Time (min.) |
|---|---|---|---|---|---|---|---|
| Cont. G | 11 | 8.9 | 17.8 | 62.3 | 0 | 0.30 | 16 |
| Ex. 14 | 11 | 8.6 | 17.2 | 60.1 | 3.1 | 0.08 | 11 |

TABLE V-continued

| | | | Norbornyl Modified Polyester Resin Concrete | | | | |
|---|---|---|---|---|---|---|---|
| Run | % Resin | % SF | % Sand | % Gravel | % & Type SP/C | % Linear Shrinkage | Work Time (min.) |
| | | | | | (SAN 100) | | |

NOTE:
SF — silica flour
Sand — Number 5 blasting sand
SP/C — ⅛-½ inch gravel
SAN 100 — styrene acrylonitrile copolymer
P.S. — polystyrene

Control H—Working Time

For the purposes of this invention working time is defined as the time interval in minutes after catalization and initial mixing of the polymer concrete components that one can spread, screed, trowel, or otherwise finish the polymer concrete without adhesion to the tools while maintaining a smooth, homogeneous surface.

A test method was developed similar to ASTM C308 using a 22 gram portion of a 1750 gram batch of polymer concrete. A 192.5 gram (11% of the batch) sample of the resin of Control A was catalyzed with 5.78 grams of methyl ethyl ketone peroxide and 0.96 grams of 6% cobalt naphthenate solution. The resin sample contained 50% styrene (by weight) as a reactive diluent. At this catalyst level, the resin will gel in about 18 minutes at 23° C. Gel time was determined by ASTM 807-83 (an is also referred to as initial set time). To the catalyzed resin, the following components were added with stirring:

150.5 grams (8.6%) of 200-400 mesh silica flour;
301.0 grams (17.2%) of #5 blasting sand;
1051.7 grams (60.1%) of ⅛-½" aggregate; and
54.2 grams (3.1%) of polystyrene A lab timer was started immediately following addition of the polystyrene. A 22 gram portion of the mixture was taken at one minute intervals and spread onto a portland cement concrete block. The material used was not returned to the mixing pan.

The working time (in minutes) was recorded in Table VI as the longest time at which the polymer concrete did not curl behind or stick to the trowel.

EXAMPLES 15 TO 19

In a manner similar to Control H other polymer concrete batches with identical gel times (18 minutes) were mixed and tested except that various amounts of styrene acrylonitrile copolymer and polystyrene were added with the aggregate. The results of these tests are set forth in Table VI.

Control I

In a manner similar to Control H, a portion of the mix of Control G having a gel time of 16 minutes was tested for work time. The result of this test is set forth in Table IV.

EXAMPLE 20

In a manner similar to Control H, a portion of the mix of Example 4 having a gel time of 16 minutes was tested for work time. The result of this test is set forth in Table VI.

EXAMPLE 21

In a manner similar to Control H, another polymer concrete batch with identical gel time (16 minutes) was mixed and tested except that styrene acrylonitrile copolymer and polystyrene was added with the aggregate. The result of this test is set forth in Table VI.

TABLE VI

| Run | % Resin | % SF | % Sand | % Gravel |
|---|---|---|---|---|
| Cont. H | 11 | 8.6 | 17.2 | 60.1 |
| Ex. 15 | 11 | 8.6 | 17.2 | 60.1 |
| Ex. 16 | 11 | 8.6 | 17.2 | 60.1 |
| Ex. 17 | 11 | 8.6 | 17.2 | 60.1 |
| Ex. 18 | 11 | 8.6 | 17.2 | 60.1 |
| Ex. 19 | 11 | 8.6 | 17.2 | 60.1 |
| Cont. I | 11 | 8.9 | 17.8 | 62.3 |
| Ex. 20 | 11 | 8.6 | 17.2 | 60.1 |
| Ex. 21 | 11 | 8.6 | 17.2 | 60.1 |

| Run | % & Type SP/C | Work Time (min.) | Homogeneous Blend |
|---|---|---|---|
| Cont. H | 3.1 (P.S.) | 4 | Yes |
| Ex. 15 | 3.1 (SAN 100) | 18 | No |
| Ex. 16 | 3.1 (95% SAN 100) (5% P.S.) | 18 | Yes |
| Ex. 17 | 3.1 (92.5% SAN 100) (7.5% P.S.) | 18 | Yes |
| Ex. 18 | 3.1 (90% SAN 100) (10% P.S.) | 10 | Yes |
| Ex. 19 | 3.1 (75% SAN 100) (25% P.S.) | 8 | Yes |
| Cont. I | 0 | 16 | Yes |
| Ex. 20 | 3.1 (SAN 100) | 16 | No |
| Ex. 21 | 3.1 (92.5% SAN 100) (7.5% P.S.) | 16 | Yes |

Table VI shows that styrene acrylonitrile copolymer with the proper amount (less than 10%) of polystyrene aids in maintaining a homogeneous blend without decreasing working time. The abbreviations are the same as in Table V.

EXAMPLE 22

A 2550 gram batch of the polymer concrete composition of example 4 containing 50% styrene monomer in the resin was used to make two by two by two inch polymer concrete cubes in accordance with ASTM C579 "method B". Catalyst levels of 4.25% (11.9 gms) methyl ethyl ketone peroxide and 1% (2.85 gms) of 6% cobalt naphthenate solution were added to the resin in order to obtain a gel time of approximately 14 minutes. Nine cubes were made and tested for compressive strength. Tests were performed one hour, three hours, five hours, and twenty-four hours from catalyst addition. The procedure used was the same as the above examples wherein the styrene acrylonitrile and polystyrene is added after the resin is catalyzed. The results are shown in Table VII where the values in pounds per square inch are an average of three samples at twenty-four hours, and two samples at 1, 3, and 5 hours, respectively.

EXAMPLE 23

A 2550 gram batch of the polymer concrete composition of example 7 containing 60% styrene monomer in the resin was used to make two by two by two inch polymer concrete cubes in accordance with ASTM C579 "method B". The resin was catalyzed with 4.25% (11.9 gms) methylethyl ketone peroxide and 1% (2.85 grams) of 6% cobalt naphthenate solution. At this catalyst level, the resin will gel in approximately 15 minutes at 23° C.

TABLE VII

| Example | Sample Age | Compressive Strength (psi) | % Linear Shrinkage |
|---|---|---|---|
| 22 | 1 hour | 336 | N.A. |
| 22 | 3 hour | 2816 | N.A. |
| 22 | 5 hour | 5214 | N.A. |
| 22 | 24 hour | 8294 | 0.07 |
| 23 | 1 hour | 305 | N.A. |
| 23 | 3 hour | 1109 | N.A. |
| 23 | 5 hour | 1813 | N.A. |
| 23 | 24 hour | 8246 | 0.04 |

Table VII shows that when polymer concrete is made using resin with high monomer content, compressive strength takes longer to develop though shrinkage is reduced.

Shear bond strength specimens were made utilizing portland cement concrete (PCC) beams measuring 3"×3"×16". These beams were made in accordance with ASTM method C192-80. Test specimens were made as described above using SAKRETE Readi-Mix concrete, with an additional 5.5 pounds of Type I portland cement per bag to increase the strength of the concrete and better simulate highway grade, i.e. high strength (psi) concrete. The test specimens were allowed to cure for a total of 28 days before the polymer concrete (PC) formulations were applied.

The concrete specimens are prepared for overlays in the following manner. (1) One side of the beam is sandblasted with number 3 type blasting sand, using a laboratory type blaster. (2) Dust and debris is removed by hand brushing. (3) A steel form is placed on the sandblasted side of the PCC beam, which measures 3"×½"×16" o.d. and 2"×½"×15" i.d.

Control J

The polymer concrete (PC) was made from a 600 gram batch using the resin of Control A. A 66.0 gram (11%0 sample of a dicyclopentadiene modified polyesteramide resin made in accordance with U.S. Pat. No. 4,410,686 was catalyzed with a 4% methyl ethyl ketone peroxide and 1% cobalt naphthenate solution. The resin sample contained (50%) styrene (by weight) as a reactive diluent.

Following the procedure of Control A, 8.9% of silica flour, 17.8% of number 5 blasting sand, and 62.3% of ⅛-¼ inch gravel was added to the catalyzed resin and the mixture was applied to the portland cement concrete beam and allowed to cure for 24 hours at 23° C. The specimens were then cut into 2"×3½"×3" specimens and allowed to remain at 23° C for a period of four days. Three (3) shear bond specimens were tested for bond strength (psi) and percent bond retention and reported in Table VIII as the average of three specimens.

EXAMPLE 24

The procedure of Control J is repeated with the addition of styrene polymer and copolymer added with the aggregate. The results are the average of three specimens and are reported in Table VIII.

NOTE:

The steel form of Control J, used to make the polymer concrete (PC) overlays onto Portland Cement Concrete (PCC) beams was modified to allow Control K, Example 25, Control L and Example 26 to be made using two PCC beams. A two-inch long by one-half inch thick, by one-half inch high steel divider was placed in the center of the form dividing it in half. The 3"×½"×16" O.D. form now has two sections measuring 2"×½"×7-¼" I.D.

Control K

The procedure of Control J was repeated using U.S.S. Chemicals MR-12803, a commercially available norbornyl modified unsaturated polyester resin. The resin sample contained 36-39% styrene (by weight) as a reactive diluent which was increased to approximately 485 in order to improve viscosity. A 300 gram batch of polymer concrete was made using 33.0 grams (11%) of the above resin. This was catalyzed with 0.5 grams of methylethylketone peroxide, 0.16 grams of 6% cobalt naphthenate solution and 0.03 grams dimethylaniline.

Following the procedure of Control A, 8.9% silica flour, 17.8% of number 5 blasting sand, and 52.3% of ⅛ to ¼ inch gravel was added to the catalyzed resin and the mixture was applied to the Portland Cement Concrete beam and allowed to cure for 24 hours at 23° C. The results are reported in Table VIII, and are the average of three specimens.

EXAMPLE 25

The procedure of Control J is repeated with the addition of styrene polymer and copolymer added with the aggregate. The results are reported in Table VIII, and are the average of three specimens.

Control L

The procedure of Control J was repeated using Aropol 8014, a commercially available norbornyl modified unsaturated polyester resin from The Ashland Chemical Co. The resin sample contained 25% styrene (by weight) as a reactive diluent which was increased to approximately 45% in order to improve viscosity. A 300 gram batch of polymer concrete was made using 33.0 grams (11%) of the above resin. This was catalyzed with 0.74 grams of methylethylketone peroxide and 0.25 grams of 6% cobalt naphthenate solution.

Following the procedure of Control A, 8.9% silica flour, 17.8% of number 5 blasting sand, and 62.3% of ⅛ to ¼ inch gravel was added to the catalyzed resin and the mixture was applied to the Portland Cement Concrete beam and allowed to cure for 24 hours at 23° C. The results are reported in Table VIII, and are the average of three specimens.

EXAMPLE 26

The procedure of Control L is repeated with the addition of styrene copolymer added with the aggregate. The results are reported in Table VIII, and are the average of three specimens.

Specimen Testing

Shear bond testing is achieved by using a direct shear (90°) method, whereby the sample is placed in a metal holding apparatus and the portland cement concrete is secured with locking nuts. A metal plate is placed on the polymer concrete overlay section. Load is applied at a rate of 0.2 inches per minute using an electromechanical testing machine. A 6,000 pound load cell was used to record the ultimate load pounds. The strength is calculated using the following equation:

$$L/A = S$$

Where L = load in pounds
A = cross sectional area
S = ultimate stress (psi)

The percent bond retention is determined by the amount of portland cement concrete remaining on the face of the polymer concrete after failure. The amount of bond is then converted to a percentage from 0 to 100 percent.

TABLE VIII

| Run | % Resin | % SF | % Sand | % Gravel | % SP/C | PSI | % Bond |
|---|---|---|---|---|---|---|---|
| Cont. J | 11 | 8.9 | 17.8 | 62.3 | 0 | 621 | 85 |
| Ex. 24 | 11 | 8.6 | 17.2 | 60.1 | 3.1 | 716 | 97 |
| Cont. K | 11 | 8.9 | 17.8 | 62.3 | 0 | 576 | 98 |
| Ex. 25 | 11 | 8.6 | 17.2 | 60.1 | 3.1 | 612 | 99 |
| Cont. L | 11 | 8.9 | 17.8 | 62.3 | 0 | 523 | 81 |
| Ex. 26 | 11 | 8.6 | 17.2 | 60.1 | 3.1 (SAN 100) | 611 | 100 |

NOTE:
% Resin = based on total formulation weight
% S.F. = silica flour 270 to 325 mesh
% sand = number 5 blasting grade
% gravel = ⅛ to ¼ inch aggregate
% SP/C = styrene polymer and copolymer (styrene acrylonitrile copolymer @ 92.5% and polystyrene homopolymer @ 7.5%)
% bond = % of portland cement concrete remaining on the face of the polymer concrete after failure.
Note:
Table VIII shows that enhanced bond strength (psi) and (%) bond retention of Portland cement concrete to polymer concrete is achieved by the addition of the styrene polymer and/or copolymer blend to the aggregate system.

We claim:
1. In a curable polymer concrete composition with a high bond strength and a long working time comprising
   (a) norbornyl modified unsaturated polyester or polyesteramide resin blend with a polymerizable monomer and
   (b) an aggregate mixture, the improvement which comprises the inclusion of
   (c) an amount of a styrene copolymer additive effective to give a measurable increase in bond strength, a longer working time or both selected from the group consisting of
      (1) styrene acrylonitrile copolymers
      (2) styrene alphamethylstyrene copolymers, and
      (3) styrene acrylonitrile copolymer mixtures with no more than 25% by weight polystyrene.
2. The composition of claim 1 wherein the said copolymer additive has a molecular weight from 5000 to 1,000,000.
3. The composition of claim 1 wherein said aggregate mixture comprises, sand, gravel, crushed rock, silica flour, fly ash, or mixtures thereof.
4. The composition of claim 1 wherein said polymerizable monomer is styrene.
5. The composition of claim 1 wherein said styrene copolymer additive is used in the range from 1.0 to 11 percent by weight based on the total weight.
6. A curable polymer concrete composition with a high bond strength and a long working time comprising
   (a) from 6 to 25% by weight of a blend of a norbornyl modified unsaturated polyester or polyesteramide resin containing 1 to 80% by weight of a polymerizable monomer,
   (b) from 93 to 64% by weight by an aggregate mixture, and
   (c) from 1.0 to 115 weight of a styrene copolymer additive consisting of
      (1) styrene acrylonitrile copolymers,
      (2) styrene alphamethyl styrene copolymers, or
      (3) styrene acrylonitrile copolymer mixture with no more than than 25% by weight of polystyrene.
7. The composition of claim 6 wherein said aggregate mixture comprises sand, gravel, crushed rock, silica flour, fly ash, or mixtures thereof.
8. The composition of claim 6 wherein said polymerizable monomer is styrene.
9. The cured compositions as set forth in any one of claims 1, 2, 3, 4, 5, 6, 7 or 8.

* * * * *

UNITED STATES PATENT AND TRADEMARK OFFICE
CERTIFICATE OF CORRECTION

PATENT NO. : 4,816,503

DATED : March 28, 1989

INVENTOR(S) : William C. Cunningham, et al.

It is certified that error appears in the above-identified patent and that said Letters Patent is hereby corrected as shown below:

Column 2, line 18, "range of" should read --range for--.

Column 2, line 26, "polymer" should read --polymers--.

Column 2, line 52, "Ndimethyl-" should read --N-dimethyl---.

Column 3, line 13, "where $R_1$" should read --wherein $R_1$--.

Column 3, line 18, "alkylene ether-linked" should read --alkylene, ether-linked--.

Column 4, line 20, "staged" should read --stages--.

Column 4, line 40, "(or other" should read --(or other)--.

Column 4, line 62, "or water" should read --of water--.

Column 5, line 9, delete the words "of water and".

Column 5, lines 13-17, delete the following sentences, "The number of fractional equivalent correspondingly decreased to any desired number of fractional equivalents, including continuous addition. The relative size of the fractional equivalents can vary."

Column 5, line 31, "mixtures" should read --mixture--.

UNITED STATES PATENT AND TRADEMARK OFFICE
CERTIFICATE OF CORRECTION

PATENT NO. : 4,816,503

DATED : March 28, 1989

INVENTOR(S) : William C. Cunningham, et al.

It is certified that error appears in the above-identified patent and that said Letters Patent is hereby corrected as shown below:

Column 5, line 62, "blasting and" should read --blasting sand--.

Column 11, below TABLE V-continued, should read --
```
NOTE:
SF       - silica flour
Sand     - Number 5 blasting sand
Gravel   - 1/8 - 1/4 inch gravel
SP/C     - styrene polymer and/or copolymer
SAN 100  - styrene acrylonitrile copolymer
P.S.     - polystyrene
```
--.

Column 11, line 29, "an" should read --and--.

Column 11, line 35, "1/8-1/2" should read --1/8-1/4"--.

Column 11, line 58, "IV" should read --VI--.

Column 11, line 62, "Example 4" should read --Example 14--.

Column 13, line 55, "(11%0" should read --(11%)--.

Column 13, line 57, "with a 4%" should read --with 4%--.

Column 14, line 28, "485" should read --48%--.

Column 14, line 34, "52.3%" should read --62.3%--.

UNITED STATES PATENT AND TRADEMARK OFFICE
CERTIFICATE OF CORRECTION

PATENT NO. : 4,816,503

DATED : March 28, 1989

INVENTOR(S) : William C. Cunningham, et al.

It is certified that error appears in the above-identified patent and that said Letters Patent is hereby corrected as shown below:

Column 15, line 46, "norbornyl" should read --a norbornyl--.

Column 16, line 23, "115" should read --11%--.

Column 16, line 46, "than than 25%" should read --than 25%--.

Signed and Sealed this

Twentieth Day of February, 1990

*Attest:*

JEFFREY M. SAMUELS

*Attesting Officer*    *Acting Commissioner of Patents and Trademarks*